United States Patent
Li et al.

(10) Patent No.: US 12,297,865 B2
(45) Date of Patent: May 13, 2025

(54) WINDING METHOD FOR RADIAL MAGNETIC BEARING STATOR, A RADIAL MAGNETIC BEARING STATOR AND A RADIAL MAGNETIC BEARING

(71) Applicant: Carrier Corporation, Palm Beach Gardens, FL (US)

(72) Inventors: Jiedong Li, Shanghai (CN); Chong Cao, Shanghai (CN); Jun Cao, Shanghai (CN); Kai Deng, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 253 days.

(21) Appl. No.: 17/747,578

(22) Filed: May 18, 2022

(65) Prior Publication Data

US 2022/0373026 A1    Nov. 24, 2022

(30) Foreign Application Priority Data

May 21, 2021 (CN) .......................... 202110558085.5

(51) Int. Cl.
| | |
|---|---|
| *F16C 32/04* | (2006.01) |
| *H02K 3/28* | (2006.01) |
| *H02K 3/48* | (2006.01) |

(52) U.S. Cl.
CPC ............. *F16C 32/048* (2013.01); *H02K 3/28* (2013.01); *H02K 3/48* (2013.01)

(58) Field of Classification Search
CPC .. F16C 32/048; F16C 32/0461; F16C 32/047; F16C 32/044; H02K 3/28; H02K 3/48;
(Continued)

(56) References Cited

U.S. PATENT DOCUMENTS

| | | | |
|---|---|---|---|
| 4,100,444 A | 7/1978 | Boyd, Jr. | |
| 6,741,009 B1 * | 5/2004 | Ando .................. | H02K 3/52 310/260 |

(Continued)

FOREIGN PATENT DOCUMENTS

| | | |
|---|---|---|
| CN | 1168189 C | 9/2004 |
| CN | 203086252 U | 7/2013 |

(Continued)

OTHER PUBLICATIONS

European Search Report for application EP 22174432.9, dated Oct. 25, 2022, 92 pages.

*Primary Examiner* — Christopher M Koehler
*Assistant Examiner* — Viswanathan Subramanian
(74) *Attorney, Agent, or Firm* — CANTOR COLBURN LLP

(57) ABSTRACT

A winding method for radial magnetic bearing stator, a radial magnetic bearing stator and a radial magnetic bearing. The winding method for radial magnetic bearing stator includes: S110, sleeving a first formed stator winding on a first stator tooth of a stator core along a radial outward direction; S120, sleeving a second formed stator winding on a second stator tooth of the stator core along a radial outward direction; S130, a first coil of the first formed stator winding is connected in series with a second coil of the second formed stator winding; the first stator tooth is adjacent to the second stator tooth, and a stator slot is formed therebetween; and the coil number of the first formed stator winding is larger than that of the second formed stator winding.

9 Claims, 2 Drawing Sheets

(58) Field of Classification Search
CPC .... H02K 2203/12; H02K 1/146; H02K 3/522; H02K 7/09; H02K 1/16; H01F 5/02; H01F 41/098
See application file for complete search history.

(56) References Cited

U.S. PATENT DOCUMENTS

| | | | |
|---|---|---|---|
| 7,288,868 | B2 | 10/2007 | Tamaki et al. |
| 8,704,422 | B2 | 4/2014 | Jurkowski |
| 10,693,336 | B2 | 6/2020 | Deng |
| 2005/0077793 | A1 | 4/2005 | Garvey et al. |
| 2005/0258702 | A1 | 11/2005 | Michaels |
| 2008/0272669 | A1 | 11/2008 | Mohle et al. |
| 2010/0127591 | A1 | 5/2010 | Court et al. |
| 2013/0257216 | A1 | 10/2013 | Park et al. |
| 2015/0233422 | A1* | 8/2015 | Irino .................. F16C 32/0461 310/90.5 |
| 2016/0036277 | A1 | 2/2016 | Lynch et al. |
| 2016/0372984 | A1* | 12/2016 | Parker .................. H02K 1/146 |

FOREIGN PATENT DOCUMENTS

| | | | | |
|---|---|---|---|---|
| CN | 103370856 | A | 10/2013 | |
| CN | 103647421 | A | 3/2014 | |
| CN | 203660676 | U | 6/2014 | |
| CN | 104600880 | A | 5/2015 | |
| CN | 105515230 | A | 4/2016 | |
| CN | 107026528 | A | 8/2017 | |
| CN | 107134867 | A | 9/2017 | |
| CN | 108377042 | A | 8/2018 | |
| CN | 108377043 | A | 8/2018 | |
| CN | 108377044 | A | 8/2018 | |
| CN | 108768006 | A | 11/2018 | |
| CN | 109193992 | A | 1/2019 | |
| CN | 109565190 | A | 4/2019 | |
| CN | 109672277 | A | 4/2019 | |
| CN | 109802500 | A | 5/2019 | |
| CN | 109818444 | A | 5/2019 | |
| CN | 209767266 | U | 12/2019 | |
| DE | 2020070075779 | U1 | 8/2007 | |
| DE | 102013201861 | B3 | 7/2014 | |
| EP | 1628380 | A1 | 2/2006 | |
| EP | 2104202 | A1 | 9/2009 | |
| EP | 2779373 | A3 | 9/2014 | |
| EP | 2896842 | A1 | 7/2015 | |
| WO | 9835423 | A1 | 8/1998 | |
| WO | WO-2012032362 | A1 * | 3/2012 | ............. F16C 17/02 |
| WO | 2013157100 | A1 | 10/2013 | |
| WO | 2014114221 | A1 | 7/2014 | |

* cited by examiner

WINDING METHOD FOR RADIAL MAGNETIC BEARING STATOR, A RADIAL MAGNETIC BEARING STATOR AND A RADIAL MAGNETIC BEARING

FOREIGN PRIORITY

This application claims priority to Chinese Patent Application No. 202110558085.5, filed May 21, 2021, and all the benefits accruing therefrom under 35 U.S.C. § 119, the contents of which in its entirety are herein incorporated by reference.

TECHNICAL FIELD OF INVENTION

The present invention relates to the field of manufacture of radial magnetic bearing parts, in particular to a winding method for radial magnetic bearing stator and a radial magnetic bearing stator and a radial magnetic bearing made using the same.

BACKGROUND OF THE INVENTION

As a mature power supply component, a radial magnetic bearing can receive electric power input, generate magnetic field and thereby output driving force, so as to provide suspension force for various types of rotating mechanical shafts. Among them, slot space factor is one of the indicators to measure its performance. Specifically, stator slot space factor refers to the ratio of the space occupied by the coils of the stator winding in the stator slot after it is placed in the stator slot. A higher slot space factor means that a stator of the same size is equipped with a stator winding with more coils, so it can also generate a stronger magnetic field at the same current. For the windings that are wound directly on the teeth of the stator, although the free winding process can be fully utilized to achieve a higher slot space factor, in practice, however, the requirements of the winding process is higher, and problems such as winding spread out or even fall off would readily occur. For the windings the winding process of which is completed in advance on wound bobbins or the like, they will be restricted by the opening width of the stator slot and the assembly process. The thickness of the winding shall not exceed the opening width of the stator slot, and it should also be ensured that the stator windings on the adjacent teeth sharing the stator slot can be mounted smoothly. As a result, the winding thickness is restricted in many ways, and the slot space factor is restricted accordingly.

SUMMARY OF THE INVENTION

The present application aims to provide a winding method for radial magnetic bearing stator, a radial magnetic bearing stator and a radial magnetic bearing, so as to at least partially solve or alleviate the problems existing in the prior art.

In order to achieve at least one object of the present application, according to one aspect of the present application, a winding method for radial magnetic bearing stator is provided, which comprises: S110, sleeving a first formed stator winding on a first stator tooth of a stator core along a radial outward direction; S120, sleeving a second formed stator winding on a second stator tooth of the stator core along a radial outward direction; S130, connecting a first coil of the first formed stator winding in series with a second coil of the second formed stator winding; wherein the first stator tooth is adjacent to the second stator tooth, and a stator slot is formed therebetween; and the coil number of the first formed stator winding is larger than that of the second formed stator winding.

In addition to one or more of the above features, or as an alternative, in another embodiment, before step S110, it further comprises: S100, winding the first coil on a first wound bobbin to form the first formed stator winding, and winding the second coil on a second wound bobbin to form the second formed stator winding; wherein the first wound bobbin and the second wound bobbin provide a radial limitation for the first coil and the second coil, respectively.

In addition to one or more of the above features, or as an alternative, in another embodiment, in step S100, the first coil is wound with respect to the first wound bobbin to have a first thickness, wherein the first thickness is approximately the width of the opening of the stator slot in the direction perpendicular to the slot wall of the stator slot.

In addition to one or more of the above features, or as an alternative, in another embodiment, in step S100, the first coil is wound with respect to the first wound bobbin to have a varying thickness; wherein the first coil with the varying thickness forms a tapered angle at the radial inner end of the first wound bobbin, and the maximum thickness of the coil of the second formed stator winding that can be sleeved on the second stator tooth is limited between the tapered angle and the second stator teeth.

In addition to one or more of the above features, or as an alternative, in another embodiment, the tapered angle formed by the first coil is parallel to the included angle of the opening of the stator slot.

In addition to one or more of the above features, or as an alternative, in another embodiment, when the radial magnetic bearing stator is an eight-pole stator, one of the first formed stator windings is corresponding to one of the second formed stator windings, and one of the first stator teeth is corresponding to one of the second stator teeth adjacent to one side of the first stator tooth; or, when the radial magnetic bearing stator is a twelve-pole stator, one of the first formed stator windings is corresponding to two of the second formed stator windings, and one of the first stator teeth is corresponding to two of the second stator teeth adjacent to both sides of the first stator tooth.

In order to achieve at least one object of the present application, according to another aspect of the present application, a radial magnetic bearing stator is provided, which comprises: a stator core having a stator yoke and adjacent first and second stator teeth disposed along the stator yoke, with a stator slot formed therebetween; a first formed stator winding sleeved on the first stator tooth of the stator core along a radial outward direction; and a second formed stator winding sleeved on the second stator tooth of the stator core along a radial outward direction; wherein a first coil of the first formed stator winding is connected in series with a second coil of the second formed stator winding; and the coil number of the first formed stator winding is larger than that of the second formed stator winding.

In addition to one or more of the above features, or as an alternative, in another embodiment, the first formed stator winding comprises: a first wound bobbin having a first main body and first end stop walls disposed at both ends of the first main body; the first coil is wound on the first wound bobbin, and is limited by the first end stop walls in the radial direction; and/or the second formed stator winding comprises: a second wound bobbin having a second main body and second end stop walls disposed at both ends of the second main body; the second coil is wound on the second wound bobbin, and is limited by the second end stop walls in the radial direction.

In addition to one or more of the above features, or as an alternative, in another embodiment, the maximum thickness of the first coil wound on the first wound bobbin is approximately the width of the opening of the stator slot in the direction perpendicular to the slot wall of the stator slot.

In addition to one or more of the above features, or as an alternative, in another embodiment, the first coil wound on the first wound bobbin forms a tapered angle at the inner radial end of the first wound bobbin, and the maximum thickness of the coil of the second formed stator winding that can be sleeved on the second stator tooth is limited between the tapered angle and the second stator tooth.

In addition to one or more of the above features, or as an alternative, in another embodiment, the tapered angle formed by the first coil is parallel to the included angle of the opening of the stator slot.

In addition to one or more of the above features, or as an alternative, in another embodiment, when the radial magnetic bearing stator is an eight-pole stator, one of the first formed stator windings corresponds to one of the second formed stator windings, and one of the first stator teeth corresponds to one of the second stator teeth adjacent to one side of the first stator tooth; or, when the radial magnetic bearing stator is a twelve-pole stator, one of the first formed stator windings corresponds to two of the second formed stator windings, and one of the first stator teeth corresponds to two of the second stator teeth adjacent to both sides of the first stator tooth.

In order to achieve at least one object of the present application, according to yet another aspect of the present application, a radial magnetic bearing is provided, which comprises the aforementioned radial magnetic bearing stator.

According to the winding method for radial magnetic bearing stator and the radial magnetic bearing stator and the radial magnetic bearing made using the same of the present application, different formed stator windings the coil winding of which has been completed are successively sleeved on different stator teeth of the stator core, the first formed stator winding mounted in advance has more coils than the second formed stator winding, and the coils of the two are connected in series. As a result, for any set of stator windings that generate a magnetic field, they have the same total coil number, and can achieve a higher slot space factor, which improves the work efficiency of the radial magnetic bearing without increasing the stator size and maintaining the low cost as well.

DETAILED DESCRIPTION OF THE INVENTION

The present application will be described in detail below with reference to exemplary embodiments in the accompanying drawings. It should be appreciated, however, that the present application may be implemented in many different forms and shall not be construed as being limited to the embodiments set forth herein. These embodiments are provided herein so that the disclosure of the present application will become more thorough and complete, and the concept of the present application will be fully conveyed to those skilled in the art.

In addition, for any single technical feature described or implied in the embodiments mentioned herein, or any single technical feature shown or implied in individual drawings, the present invention still allows for any combination or deletion of these technical features (or equivalents thereof) without any technical obstacle, thereby obtaining further embodiments of the present application that may not be directly mentioned herein.

For the convenience of describing the embodiments mentioned herein, the axial direction, the radial direction and the circumferential direction are introduced herein as the reference coordinate system. The way of describing directions is used to express the structural characteristics of the respective components and the relative positional relationships therebetween, but not to restrict their absolute positional relationships. Taking the radial magnetic bearing stator in FIG. 1 as an example, the axial direction means that a number of stator sheets of the radial magnetic bearing stator are stacked in the lamination direction of the stator core, the radial direction refers to the extension direction of the stator core radius, and the circumferential direction refers to the peripheral direction of the stator core.

Figure 1:
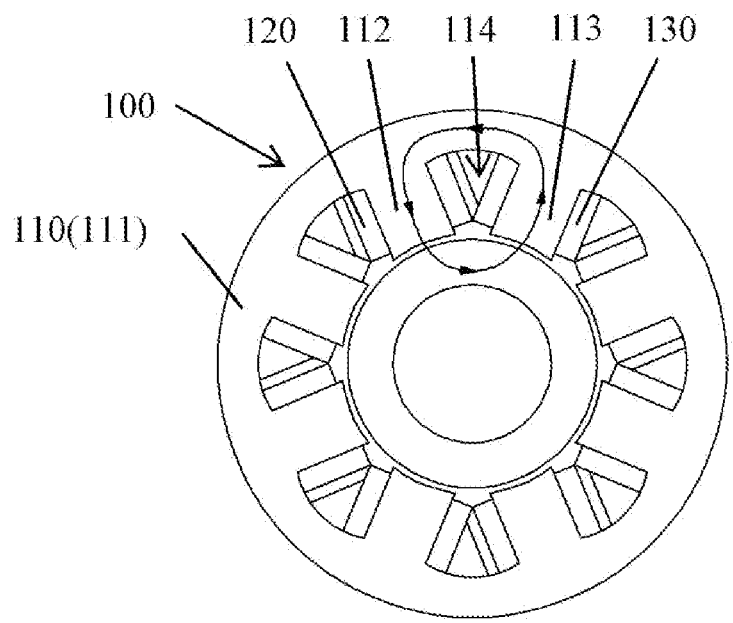
FIG. 1 is a schematic diagram of an embodiment of a radial magnetic bearing stator according to the present application.
Figure 2:
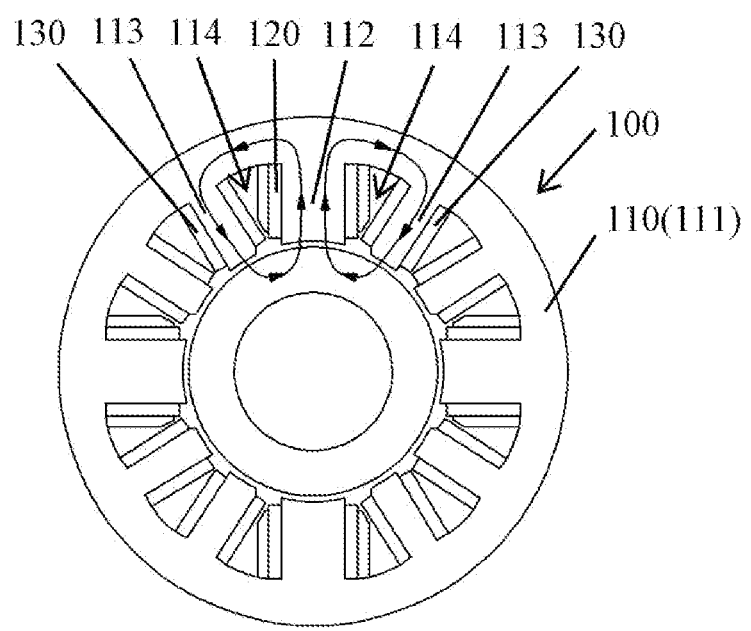
FIG. 2 is a schematic diagram of another embodiment of a radial magnetic bearing stator according to the present application.
Figure 3:
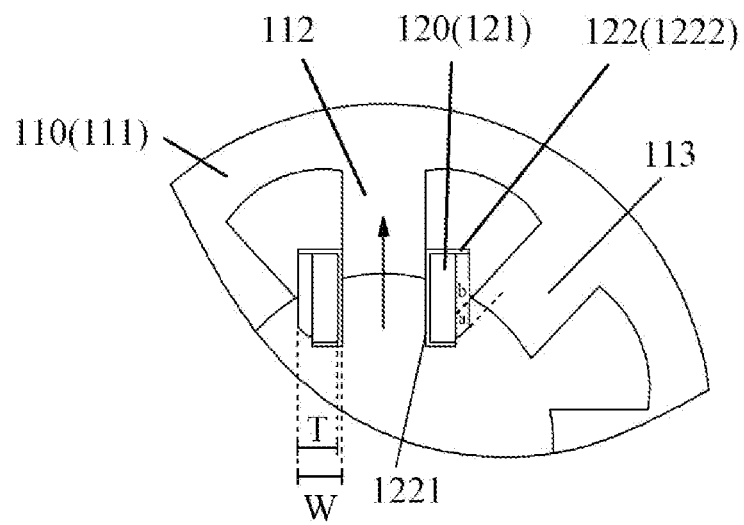
FIG. 3 is a schematic diagram of one step of a winding method for radial magnetic bearing stator according to the present application.
Figure 4:
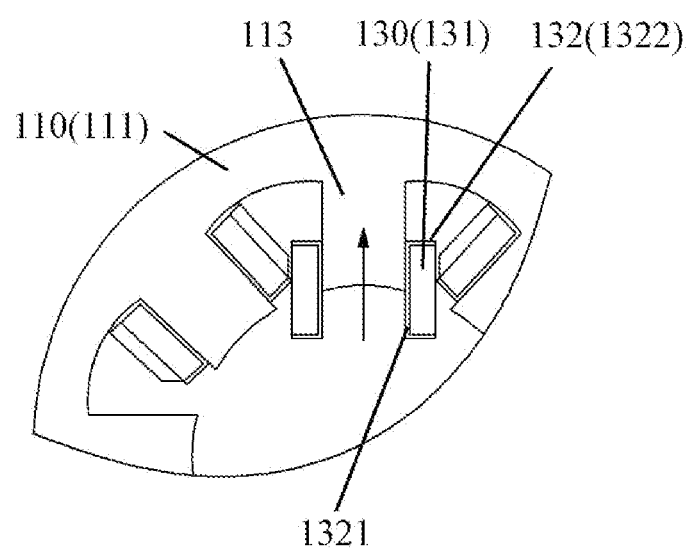
FIG. 4 is a schematic diagram of another step of a winding method for radial magnetic bearing stator according to the present application.

Referring to FIGS. 1 and 2, a plurality of embodiments of the radial magnetic bearing stator assembled according to the winding method of the present application are illustrated. FIGS. 3 and 4 illustrate the mounting process of the formed stator windings. Most of the arrangements of the radial magnetic bearing stators in these embodiments are similar. The difference mainly lies in the way the coil is connected between the windings when having different number of poles. The common characteristics of these embodiments of the winding method for radial magnetic bearing stator will be introduced first as follows, and then the unique characteristics thereof will be described with reference to different drawings.

Referring first to FIGS. 1, 3 and 4, in order to obtain the radial magnetic bearing stator shown in FIG. 1, the steps shown in FIGS. 3 and 4 can be followed to assemble the formed stator windings. Specifically, a radial magnetic bearing stator 100 shown in the figure comprises a stator core 110 formed by stacking a number of stator sheets. The stator core 110 has a stator yoke 111 and adjacent first stator teeth 112 and second stator teeth 113 disposed along the stator yoke 111, wherein a stator slot 114 is formed between the first stator teeth 112 and the second stator teeth 113. It should be appreciated that the aforementioned first stator teeth 112 and the second stator teeth 113 are for distinction and understanding when describing the solutions, but are not intended to limit the two to have different configurations. For example, in most cases, these stator teeth have the same shape and configuration for the purpose of simple molding and convenient processing. More specifically, the winding method for radial magnetic bearing stator in this embodiment comprises at least two steps: firstly, S110 (as shown in FIG. 3) is performed, i.e., a first formed stator winding 120 with more coils is sleeved on the first stator tooth 112 of the stator core 110 along a radial outward direction. S120 is then performed (as shown in FIG. 4), i.e., a second formed stator winding 130 with less coils to be connected in series with the first formed stator winding 120 is sleeved on the second stator tooth 113 of the stator core 110 along a radial outward direction. And then, S130 is performed such that the first coil 121 of the first formed stator winding 120 is connected in series with the second coil 131 of the second formed stator winding 130.

Under such an arrangement, by mounting the first formed stator winding 120 which has more coils than the second formed stator winding 130 in advance, the number of coils that can be arranged in the stator slot can be increased as much as possible, thereby improving the slot space factor. And, by arranging the first formed stator winding 120 and the second formed stator winding 130 as a set with coils thereof connected in series, it can be ensured that for any set of stator windings that generate a magnetic field, they still have the same total coil numbers, so the magnetic field generated will not be offset due to the inconsistent coils of each winding. Generally speaking, the work efficiency of the radial magnetic bearing is improved without increasing the stator size and maintaining the low cost as well.

Further modifications on the winding method and the corresponding changes in the radial magnetic bearing stator structure will be introduced below by way of illustrative descriptions, so as to further improve the work efficiency and reliability thereof, or for other improvement considerations.

For example, before performing the step of assembling the formed stator windings and the radial magnetic bearing stator, as an example of fabricating a formed stator winding, the method may further comprise step S100: winding the first coil 121 on a first wound bobbin 122 to form the first formed stator winding 120, and winding the second coil 131 on a second wound bobbin 132 to form the second formed stator winding 130. The first formed stator winding 120 thus formed comprises the first wound bobbin 122 and the first coil 121, and the first wound bobbin 122 has a first main body 1221 configured as a sleeve structure with a through hole. The through hole matches with the outer contour of the first stator tooth 112, such that the first main body 1221 is mounted on the first stator tooth 112 through the through hole. The first wound bobbin 122 also has first end stop walls 1222 disposed at both ends of the first main body 1221 to form a disc-shaped structure, and the middle portion thereof is kept open to avoid blocking of the through hole of the first main body 1221. With the help of the first end stop walls 1222, when the first coil 121 is wound on the first main body 1221 until it abuts against the first end stop walls 1222 on both sides, it will be limited by the first end stop walls 1222 along the radial direction. Similarly, the second wound bobbin 132 has a second main body 1321 also configured as a sleeve structure with a through hole. The through hole matches with the outer contour of the second stator teeth 113, such that the second main body 1321 is mounted on the second stator teeth 113 through the through hole. The second wound bobbin 132 also has second end stop walls 1322 disposed at both ends of the second main body 1321 to form a disc-shaped structure, and the middle portion thereof is kept open to avoid blocking of the through hole of the second main body 1321. With the help of the second end stop walls 1322, when the second coil 131 is wound on the second main body 1321 until it abuts against the second end stop walls 1322 on both sides, it will be limited by the second end stop walls 1322 along the radial direction. As a result, the coils formed on the formed stator winding have a more reliable positioning, so problems such as extension deformation or fall off can be avoided.

On this basis, in order to further improve the slot space factor of the winding arrangement, in step S100, the first coil 121 can also be wound with respect to the first wound bobbin 122 to have a first thickness T, and the first thickness T may be approximately the width W in the opening direction of the stator slot 114 in the direction perpendicular to the slot wall of the stator slot 114. At this time, considering the assembly tolerance and other issues, this step realizes that the first formed stator winding 120 mounted on the radial magnetic bearing stator has almost the largest possible coil number.

Similarly, also to further improve the slot space factor of the winding arrangement, in step S100, the first coil 121 can also be wound with respect to the first wound bobbin 122 to have a varying thickness; wherein the first coil 121 with the varying thickness forms a tapered angle a at the radial inner end of the first wound bobbin 122, and the maximum thickness of the coil of the second formed stator winding 130 that can be sleeved on the second stator teeth 113 is limited between the tapered angle a thus formed and the second stator teeth 113. At this time, when the first formed stator winding 120 is mounted, the number of coils of the second formed stator winding 130 that can possibly be mounted is also taken into consideration. And, the number of coils of the second formed stator winding 130 is adjusted by adjusting the contour enclosed by the first coil 121 wound with respect to the first wound bobbin 122 on the first formed stator winding 120, so that the second formed stator winding 130 can also have a relatively lager coil number, and the sum of the coil number of the two winding can be increased finally On this basis, optionally, the winding method can be adjusted so that the tapered angle a formed by the first coil 121 is parallel to the side wall of the second stator tooth 113, that is, the angle a is substantially parallel and equal to the included angle of the opening of the stator slot (that is, the auxiliary dotted line of the tapered angle a shown in FIG. 3 is parallel to the left side wall of the second stator tooth 113; in other words, the tapered angle a shown in FIG. 3 is substantially the same as the included angle b of the left side wall of the second stator tooth 113 with respect to the first wound bobbin 122). At this time, the coil number of the second formed stator winding 130 can be further increased.

With continued reference to FIG. 1, when the aforementioned winding method is applied to the eight-pole radial magnetic bearing stator 100, it is arranged such that a first formed stator winding 120 corresponds to a second formed stator winding 130, and the two are made to become a set of windings connected in series with each other. And at this time, two stator teeth are provided for mounting these windings, i.e., a first stator tooth 112 and a corresponding second stator teeth 113 adjacent to one side of the first stator tooth 112.

Turning to FIG. 2, when the aforementioned winding method is applied to the twelve-pole radial magnetic bearing stator 100, it is arranged such that a first formed stator winding 120 corresponds to two second formed stator windings 130, and the three are made to become a set of windings connected in series with each other. And at this time, three stator teeth are provided for mounting these windings, i.e., a first stator tooth 112 and two corresponding second stator teeth 113 adjacent to both sides of the first stator tooth 112.

In addition, although not shown in the figures, an embodiment of a radial magnetic bearing according to the present application is further provided herein. The radial magnetic bearing comprises a radial magnetic bearing stator according to any of the foregoing embodiments or combinations thereof, and thus also has corresponding technical effects, which will not be repeated here.

The above examples mainly describe a winding method for radial magnetic bearing stator, a radial magnetic bearing stator and a radial magnetic bearing according to the present application. Although only a few of the embodiments of the present application are described, those skilled in the art shall appreciate that the present application may, without departing from the spirit and scope thereof, be implemented in many other forms. Accordingly, the examples and embodiments illustrated are to be regarded as illustrative but not restrictive, and the present application may, without departing from the spirit and scope of the application as defined by the appended claims, cover various modifications and replacements.

What is claimed is:

1. A winding method for radial magnetic bearing stator, comprising:
   S 110, sleeving a first formed stator winding on a first stator tooth of a stator core along a radial outward direction;
   S 120, sleeving a second formed stator winding on a second stator tooth of the stator core along a radial outward direction;
   S130, a first coil of the first formed stator winding is connected in series with a second coil of the second formed stator winding;
   wherein the first stator tooth is adjacent to the second stator tooth, and a stator slot is formed therebetween and the coil number of the first coil of the first formed stator winding is larger than that of the second coil of the second formed stator winding;
   wherein before step S110, further comprising: S 100, winding the first coil on a first wound bobbin to form the first formed stator winding, and winding the second coil on a second wound bobbin to form the second formed stator winding;
   wherein in step S 100, the first coil is wound with respect to the first wound bobbin to have a varying thickness; wherein the first coil having a cylindrical section having uniform thickness and the varying thickness forms a tapered angle between the cylindrical section to a flat section at a wall of the first wound bobbin at the radial inner end of the first wound bobbin, wherein the flat section is substantially perpendicular to the cylindrical section, and a maximum thickness of the second coil of the second formed stator winding that can be sleeved on the second stator tooth is limited between the tapered angle and the second stator tooth.

2. The winding method according to claim 1, wherein the radial magnetic bearing stator is an eight-pole stator, one of the first formed stator windings corresponds to one of the second formed stator windings, and one of the first stator teeth corresponds to one of the second stator teeth adjacent to one side of the first stator tooth.

3. The winding method according to claim 1, wherein the tapered angle formed by the first coil is parallel to an included angle of an opening of the stator slot.

4. A radial magnetic bearing stator, comprising:
   a stator core having a stator yoke and adjacent first and second stator teeth disposed along the stator yoke, with a stator slot formed therebetween;
   a first formed stator winding sleeved on the first stator tooth of the stator core along a radial outward direction; and
   a second formed stator winding sleeved on the second stator tooth of the stator core along the radial outward direction;
   wherein, a first coil of the first formed stator winding is connected in series with a second coil of the second formed stator winding; and the coil number of the first coil of the first formed stator winding is larger than that of the second coil of the second formed stator winding;
   wherein the first coil has a varying thickness;
   wherein the first coil has a cylindrical section having uniform thickness and the varying thickness forms a tapered angle between the cylindrical section to a flat section at a wall of the first coil at the radial inner end of the first coil, wherein the flat section is substantially perpendicular to the cylindrical section, and a maximum thickness of the second coil of the second formed stator winding that can be sleeved on the second stator tooth is limited between the tapered angle and the second stator tooth.

5. The radial magnetic bearing stator according to claim 4,
   wherein the radial magnetic bearing stator is an eight-pole stator, one of the first formed stator windings corresponds to one of the second formed stator windings, and one of the first stator teeth corresponds to one of the second stator teeth adjacent to one side of the first stator tooth.

6. The radial magnetic bearing stator according to claim 4, wherein,
   the first formed stator winding comprises:
   a first wound bobbin having a first main body and first end stop walls disposed at both ends of the first main body;
   wherein the first coil is wound on the first wound bobbin and is limited by the first end stop walls in the radial direction; and/or
   the second formed stator winding comprises:
   a second wound bobbin having a second main body and second end stop walls disposed at both ends of the second main body;
   wherein the second coil is wound on the second wound bobbin and is limited by the second end stop walls in the radial direction.

7. The radial magnetic bearing stator according to claim 6, wherein a maximum thickness of the first coil wound on the first wound bobbin is approximately a width of an opening of the stator slot in a direction perpendicular to a slot wall of the stator slot.

8. The radial magnetic bearing stator according to claim 4, wherein the tapered angle formed by the first coil is parallel to an included angle of the opening of the stator slot.

9. A radial magnetic bearing, comprising: the radial magnetic bearing stator according to claim 4.

* * * * *